(12) United States Patent
Kim et al.

(10) Patent No.: US 7,559,970 B2
(45) Date of Patent: Jul. 14, 2009

(54) METHOD FOR PRODUCING METAL NANOPARTICLES AND METAL NANOPARTICLES PRODUCED THEREBY

(75) Inventors: Tae-Hoon Kim, Yongin-si (KR);
Jae-Woo Joung, Suwon-si (KR);
Sung-Nam Cho, Suwon-si (KR);
Chang-Sung Park, Suwon-si (KR);
Kwi-Jong Lee, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/940,049

(22) Filed: Nov. 14, 2007

(65) Prior Publication Data

US 2008/0207934 A1 Aug. 28, 2008

(30) Foreign Application Priority Data

Dec. 14, 2006 (KR) .................. 10-2006-0127697

(51) Int. Cl.
*C22B 11/00* (2006.01)
*G03C 1/494* (2006.01)
*C07F 1/00* (2006.01)
*C09D 11/06* (2006.01)
*H01L 21/316* (2006.01)

(52) U.S. Cl. .................. 75/711; 554/71; 554/74; 556/110; 556/137; 556/138; 106/31.13; 106/287.18

(58) Field of Classification Search .................. 75/711; 554/71, 74; 106/31.13, 287.18; 556/110, 556/137, 138; 430/618
See application file for complete search history.

(56) References Cited

FOREIGN PATENT DOCUMENTS

| JP | 2005-81501 | | 3/2005 |
|---|---|---|---|
| JP | 2005081501 A | * | 3/2005 |

OTHER PUBLICATIONS

Korean Office Action issued in Korean Patent Application No. KR 10-2006-0127697, mailed Oct. 16, 2007.

* cited by examiner

*Primary Examiner*—Stuart Hendrickson
*Assistant Examiner*—Daniel Berns
(74) *Attorney, Agent, or Firm*—McDermott Will & Emery LLP

(57) ABSTRACT

The present invention relates to a method for producing metal nanoparticles and metal nanoparticles produced thereby, in particular, to a method for producing metal nanoparticles used for inkjet that comprises, preparing metal nanoparticles capped with a fatty acid; heating a mixture of the capped metal nanoparticles and a linear or branched first amine of C1-C7 so that a part of the fatty acid is substituted to the first amine; and heating after adding a linear or branched second amine of $C_8$-$C_{20}$ to the mixture so that the first amine is re-substituted to the second amine. According to the present invention, metal nanoparticles capped with 2 kinds of dispersants can be produced massively, and its application to ink for inkjet technique can lower the curing temperature of ink.

11 Claims, 4 Drawing Sheets

20nm

METHOD FOR PRODUCING METAL NANOPARTICLES AND METAL NANOPARTICLES PRODUCED THEREBY

CROSS-REFERENCE TO RELATED APPLICATIONS

This application claims the benefit of Korean Patent Application No. 10-2006-0127697 filed on Dec. 14, 2006, with the Korea Intellectual Property Office, the contents of which are incorporated here by reference in their entirety.

BACKGROUND

1. Technical Field

The present invention relates to a method for producing metal nanoparticles and metal nanoparticles produced thereby, in particular, a method for metal nanoparticles including 2 kinds of dispersants on their surface and metal nanoparticles produced thereby.

2. Description of the Related Art

Noncontact direct writing technology using inkjet method has advantage not only in the cost for materials but also the manufacturing time, since it allows precise ejection to desired positions with fixed quantity. Since for the industrial applications, ink suitable for the inkjet method should be developed, many researches about methods for producing metal particles in mass production with low cost have been performed in order to develop materials for the inkjet method.

Though the vapor-phase method for particle production is advantageous to produce nanoparticles, but it has problems of complicated processes, difficulty in manufacturing with uniform quality and setting up a safe working environment because of high risk of environmental pollution and dangerous explosion during the process.

On the other hand, the solution method has advantage in that it has high yield rate particularly in the precious metals, but capping the surface of particles with various kinds of dispersants is required to lower the curing temperature of ink. Japan patent application No. JP2005-81501 discloses metal nanoparticles and manufacturing method of the nanoparticles around which organic metal compounds and/or amine metal complexes are attached, but the method has quite low yield rate and is not appropriate for manufacturing low price materials.

Therefore, a new method that allows mass production of metal nanoparticles whose surface capped with appropriate dispersants in order to cure ink at low temperature is needed.

SUMMARY

The present invention is to address the existing problems set forth above, and the invention provides a method for producing metal nanoparticles with a high yield rate, using organic compounds having low melting temperature in order to lower the heating temperature of ink.

The present invention further provides metal nanoparticles produced by capping with 2 kinds of dispersants according to the method set forth above.

According to one aspect of the invention, the present invention provides a method for producing metal nanoparticles for inkjet including, preparing metal nanoparticles capped with a fatty acid;

heating a mixture of the capped metal nanoparticles and a linear or branched first amine of C1-C7 so that a part of the fatty acid is substituted by the first amine; and heating after adding a linear or branched second amine of $C_8$-$C_{20}$ to the mixture so that the first amine is re-substituted by the second amine.

Here, the metal nanoparticles may include one or more metals selected from the group consisting of silver, gold, copper, nickel, cobalt, platinum, palladium and their alloys.

According to an embodiment of the invention, the fatty acid is saturated or unsaturated fatty acids of $C_3$-$C_{22}$. Examples of the fatty acid may be one or more compounds selected from the group consisting of hexanoic acid, heptanoic acid, nonanoic acid, decanoic acid, undecanoic acid, dodecanoic acid, oleic acid, myristic acid, palmitic acid, stearic acid, linolic acid, linoleic acid and linolenic acid.

According to an embodiment of the invention, the organic solvent may be one or more non-aqueous solvents selected from the group consisting of hexane, toluene, xylene, chloroform, dichloromethane, tetradecane, octadecene, chlorobenzoic acid, 1-hexadecene, 1-tetradecene and 1-octadecene.

According to an embodiment of the invention, the first amine is one or more compounds selected from the group consisting of methyl amine, ethyl amine, propyl amine, butyl amine, hexyl amine, heptyl amine, aryl amine and N,N-diisopropylamine. The second amine is one or more compounds selected from the group consisting of octyl amine, nonyl amine, decyl amine, dodecyl amine, oleyl amine, 2-ethylhexyl amine and hexadecyl amine.

According to an embodiment of the invention, the first amine is added 50-200 parts by weight, and the organic solvent is added 100-300 parts by weight with respect to 100 parts by weight of metal nanoparticles in preparing the mixture. Further, metal nanoparticles substituted by the first amine can be obtained by heating the mixture to 60-90° C. for several minutes to several hours.

According to an embodiment of the invention, the second amine is preferably added 50-100 parts by weight with respect to 100 parts by weight of metal nanoparticles. Further, metal nanoparticles in which the first amine is eliminated and substituted by the second amine can be obtained by heating to 100-120° C. for several minutes to several hours.

Another aspect of the invention provides metal nanoparticles for inkjet technique including linear or branched amine of $C_8$-$C_{20}$ as dispersant on their surface.

According to an embodiment of the invention, the fatty acid is saturated or unsaturated fatty acids of $C_3$-$C_{22}$. Examples of the fatty acid may be one or more compounds selected from the group consisting of hexanoic acid, heptanoic acid, nonanoic acid, decanoic acid, undecanoic acid, dodecanoic acid, oleic acid, myristic acid, palmitic acid, stearic acid, linolic acid, linoleic acid and linolenic acid.

According to an embodiment, the amine is one or more compounds selected from the group consisting of octyl amine, nonyl amine, decyl amine, dodecyl amine, oleyl amine, 2-ethylhexyl amine and hexadecyl amine.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION

Figure 1:
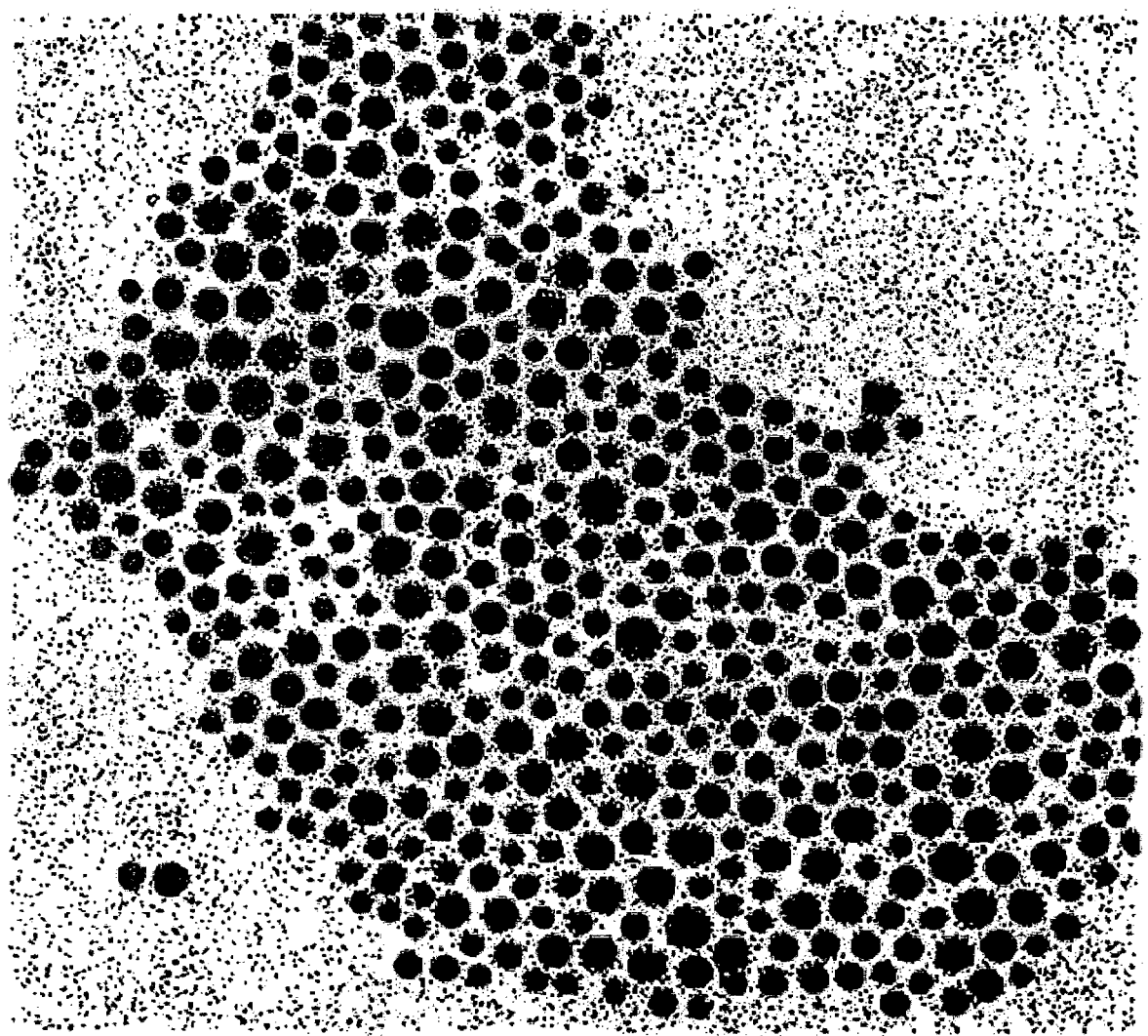
FIG. 1 is a TEM image of the silver nanoparticles produced according to an embodiment of the invention.

Hereinafter, the method for producing metal nanoparticles and metal nanoparticles produced thereby according to the present invention will be described more specifically.

The present invention is to provide metal nanoparticles capped with 2 kinds of dispersants under a non-aqueous solvent system, in which metal nanoparticles are easily produced by employing an oil-based ink, not additional substitution of surfactant, and metal nanoparticles with high yield rate are produced environment-friendly, so that the curing temperature can be lowered during the production of ink.

The method of producing metal nanoparticles for inkjet technique according to the present invention includes, preparing metal nanoparticles capped with a fatty acid;

heating a mixture of the metal nanoparticles capped with a fatty acid and a linear or branched first amine of $C_1$-$C_7$ so that the part of the fatty acid is substituted by the first amine; and heating after adding a linear or branched second amine of $C_8$-$C_{20}$ to the mixture so that the first amine is re-substituted by the second amine The method of producing metal nanoparticles according to the invention is first preparing metal nanoparticles capped with a fatty acid.

Here, the metal nanoparticles may include one or more metals selected from the group consisting of silver, gold, copper, nickel, cobalt, platinum, palladium and their alloys.

Since the fatty acid used in the invention is a compound that acts as a dispersant or a capping molecule, the size of metal nanoparticles can be adjusted and the stability of dispersion can be obtained by the fatty acid. In the present invention, the fatty acid may be saturated fatty acids ($CnH_{2n}O_2$), oleic acids ($CnH_{2n-2}O_2$), linoleic acids ($CnH_{2n-4}O_2$), linolenic acids ($CnH_{2n-6}O_2$) or highly unsaturated fatty acids ($CnH_{2n-8}O_2$, $CnH_{2n-10}O_2$, $CnH_{2n-12}O_2$). Here, the fatty acid is preferably a saturated or unsaturated fatty acid of $C_3$-$C_{22}$, and more particularly, it may be one or more acids selected from the group consisting of hexanoic acid, heptanoic acid, nonanoic acid, decanoic acid, undecanoic acid, dodecanoic acid, oleic acid, myristic acid, palmitic acid, stearic acid, linolic acid, linoleic acid and linolenic acid.

The step of preparing metal nanoparticles capped with the fatty acid can be performed by various methods previously disclosed by the inventor. For example, according to Korean patent application no. KR2005-72478, using copper compounds which functions as a reducing agent, metal nanoparticles capped with fatty acids, such as alkanoic acids, i.e., lauric acid, oleic acid, decanoic acid, palmitic acid, can be obtained. According to Korean Patent Application No. KR2005-66936, capping of the fatty acid around the metal nanoparticles can be achieved by heat treatment of the metal alkanoate. According to Korean Patent Application No. KR2006-64481, after dissociation of a metal precursor in a fatty acid using salts of metals such as tartar, magnesium, iron as a metal catalyst, metal nanoparticles can be capped with a fatty acid. Further, Korean Patent Application No. KR2006-98315, via heat treatment after dissociating a copper precursor molecule in a fatty acid or further addition of a reducing agent, copper nanoparticles capped in a fatty acid can be obtained.

However, the methods set forth above are just examples, the invention is not limited to these examples and it is clear that various methods can be used to prepare metal nanoparticles capped with a fatty acid in the present invention. It is also apparent that more changes may be made by those skilled in the art without departing from the principles and spirit of the present invention.

The fatty acid attached and capped to the surface of metal nanoparticles is preferably 10-25 parts by weight with respect to 100 parts by weight of metal nanoparticles.

Next, a part of the fatty acid is substituted with the first amine by heating a mixture of metal nanoparticles capped with the fatty acid in an organic solvent and a linear or branched first amine of C1-C7.

The organic solvents which can be used in the invention are non-aqueous solvents, for example, hexane, toluene, chloroform, dichloromethane, tetradecane, octadecene, chlorobenzoic acid, 1-hexadecene, 1-tetradecene and 1-octadecene, etc. but are not limited to these. The organic solvent may be used individually or as a mixture of 2 or more of them, and it is also acceptable that the organic solvent used in the step of preparing metal nanoparticles capped in fatty acid, can be used without departing metal nanoparticles from it by a separating technique. The organic solvent is mixed 100-300 parts by weight with respect to 100 parts by weight of metal nanoparticles. If the content of the organic solvent is less than 100 parts by weight, particles cannot be fully dissolved and thus the effect of stable reaction cannot be obtained. On the other hand, if the content exceeds 300 parts by weight, it is not preferable with respect to productivity.

The first amine is a linear or branched amine compound of $C_1$-$C_7$, and it may be a primary amine or a secondary amine. The first amines can be attached and substituted to a certain part of the fatty acid that is capped on the surface of metal nanoparticles, because they have short carbon chains and greater adhesion to the surface of metal particles than the fatty acids. The first amine may be one or more compounds selected from the group consisting of methyl amine, ethyl amine, propyl amine, butyl amine, hexyl amine, heptyl amine, aryl amine, N,N-diisopropyl amine. The content of the first amine is 50-200 parts by weight with respect to 100 parts by weight of metal nanoparticles. If the content of the first amine is lower than 50 parts by weight, the quantity of substituted particles decreases, while if the content exceeds 200 parts by weight, it is not preferable due to increased production cost.

By heating the mixture of the metal nanoparticles and the first amine at a certain temperature, a part of the fatty acid on the surface of metal nanoparticles are substituted by the first amine. This heating is performed at 60-90° C. for several hours so that the substitution of the amine occurs easily. If the heating temperature is lower than 60° C., the substitution decreases, while if the heating temperature exceeds 90° C., it may surpass the boiling point of the first amine used. The heating process may be preformed for several hours so that the first amine can be substituted. The process may be repeated for several times to optimize the substitution.

After the substitution to the first amine, a linear or branched second amine is added and heated so that the first amine is substituted by the second amine.

Here, the second amine is a linear or branched amine compound of $C_8$-$C_{20}$, it may also be a primary amine or a secondary amine. The second amine has a longer carbon chain than the first amine and thus, it can be substituted by the position of the first amine that has shorter chain and can be attached to the surface of metal particles. This second amine may be one or more compounds selected from the group consisting of octyl amine, nonyl amine, decyl amine, dodecyl amine, oleyl amine, 2-ethylhexyl amine and hexadecyl amine. The second amine is preferably added by 50-200 parts by weight with respect to 100 parts by weight of metal nanoparticles. If the content of the second amine is lower than 50 parts by weight, the quantity of substituted particles decreases, while if the content exceeds 200 parts by weight, it is not preferable due to increased production cost.

The second amine added mixture is heated to 100-120° C. for several minutes to several hours to detach the first amine and re-attach the second amine, which is a process of re-substitution. If the reaction temperature is lower than 100° C., re-attachment of the second amine cannot occur easily, while if the reaction temperature exceeds 120° C., it is not preferable since pyrolysis of the second amine can occur. Further, the reaction time is maintained for several hours considering the process of substitution. It is helpful that the process is repeated for several times to optimize the substitution.

The method of the invention is producing metal nanoparticles capped with 2 kinds of dispersants, via substituting a part of fatty acids that are attached to the surface of metal nanoparticles obtained with high yield rate to a short chain amine and then substituting the short chain amine by a long chain amine. Through the steps set forth above, mass production of the metal nanoparticles can be obtained with the simple process.

Another aspect of the invention provides metal nanoparticles having a fatty acid and a linear or branched amine of $C_8$-$C_{20}$ as a dispersant on their surface.

Metal nanoparticles according to the present invention can be produced via the method described above. Here the fatty acid is a saturated or unsaturated fatty acid of $C_3$-$C_{22}$. More specifically, the fatty acid may be one or more acids selected from the group consisting of hexanoic acid, heptanoic acid, nonanoic acid, decanoic acid, undecanoic acid, dodecanoic acid, oleic acid, myristic acid, palmitic acid, stearic acid, linolic acid, linoleic acid and linolenic acid.

Because the metal nanoparticles having this structure are capped with 2 dispersants of a fatty acid and an amine on their surface, and produced in a non-aqueous system, they have superior mixibility with non-aqueous based organic solvents and can be produced in a high concentration without using additional surfactants. Further, since they are attached with the amine that has lower melting temperature than fatty acids, there is advantage that the heating temperature can be lowered down after ejecting via inkjet.

Hereinafter, explanations will be given in greater detail with specific examples. The invention is not limited to these examples.

EXAMPLE OF PRODUCTION

Figure 2:
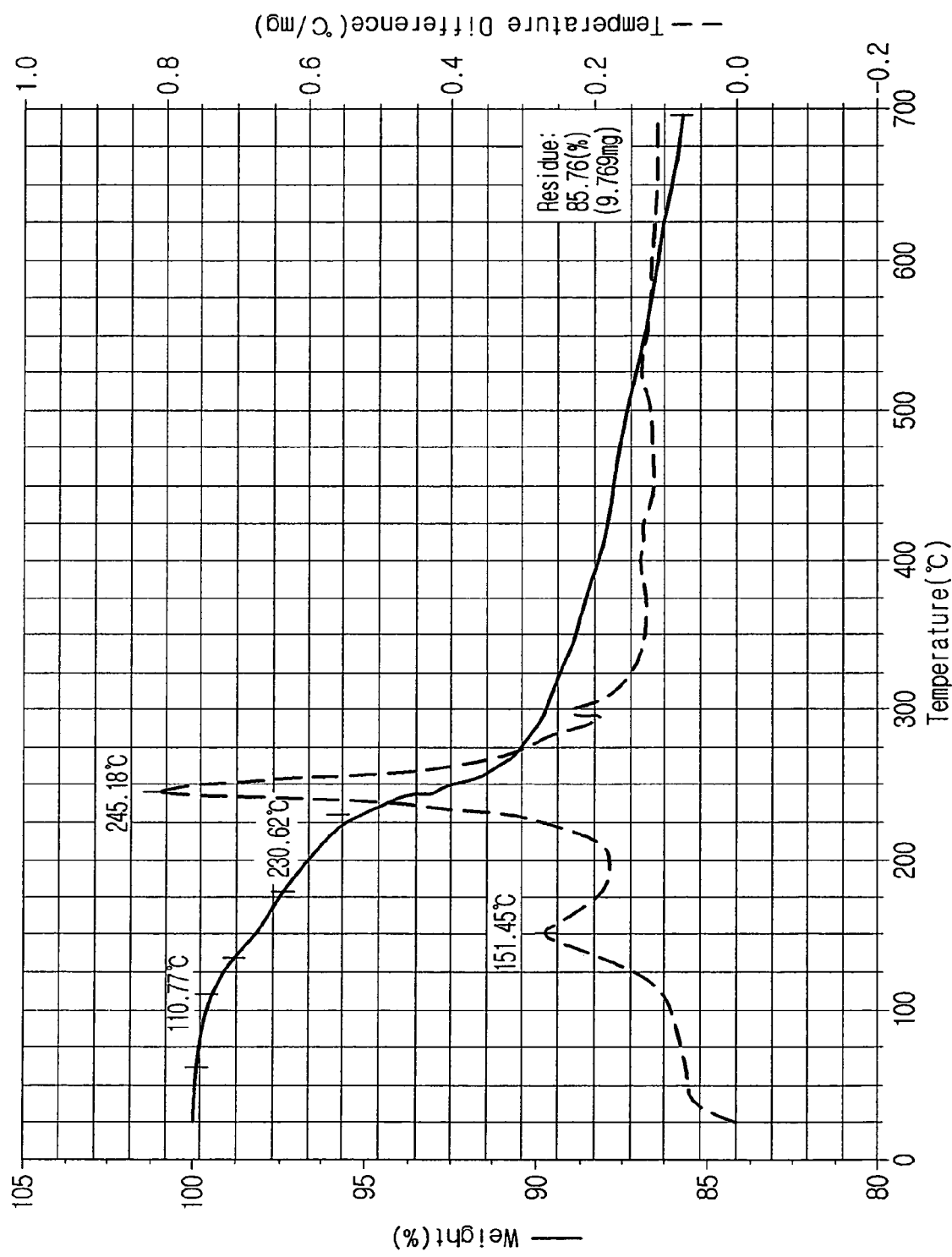
FIG. 2 is a graph representing TGA analysis for the silver nanoparticles produced according to an embodiment of the invention.

To produce metal nanoparticles capped with a fatty acid, after 170 g of $AgNO_3$ and $Cu(acac)_2$ compound 20 g were mixed in 300 g of toluene solvent, butyl amine 100 g was further added and agitated. 50 g of oleic acid was added and the mixture was heated to 110° C. and agitated for 1 hour and then cooled down to room temperature (28° C.). Ag nanoparticles added to methanol, isolated and precipitated by centrifugation. As shown in FIG. 1, 5 nm of 90 g Ag nanoparticles capped with oleic acid and having uniform particle distribution were obtained. Ag content was found to be 85 weight % according to the results of TGA analysis shown in FIG. 2.

Example 1

50 g of Ag nanoparticles produced above and 100 g of butyl amine was mixed and incubated in toluene at 80° C. for 1 hour so that a part of fatty acid is substituted by butyl amine. Next, 250 g of silver nanoparticles capped with 2 dispersant of oleic acid and dodecyl amine were produced by adding 100 g of dodecyl amine to the mixture and incubating at 120° C. for 1 hour so that butyl amine is re-substituted.

Examples 2-9

Silver nanoparticles capped with 2 dispersants were produced using the same process described in Example 1, except using the first amine and the second amine as described in table 1.

TABLE 1

|   | Ag nanoparticle | First amine | Second amine | Final Dispersant (2 kinds) |
|---|---|---|---|---|
| Example 2 | 50 g of Ag nanoparticles capped with oleic acid | 100 g of butyl amine | 100 g of dodecyl amine | Oleic acid Dodecyl amine |
| Example 3 | 50 g of Ag nanoparticles capped with oleic acid | 200 g of butyl amine | 200 g of Nonyl amine | Oleic acid Nonyl amine |
| Example 4 | 50 g of Ag nanoparticles capped with oleic acid | 25 g of butyl amine | 25 g of Decyl amine | Oleic acid Decyl amine |
| Example 5 | 50 g of Ag nanoparticles capped with oleic acid | 50 g of butyl amine | 100 g of 2-steraryl amine | Oleic acid 2-steraryl amine |
| Example 6 | 50 g of Ag nanoparticles capped with oleic acid | 100 g of aryl amine | 50 g of Dodecyl amine | Palmitic acid Dodecyl amine |
| Example 7 | 50 g of Ag nanoparticles capped with oleic acid | 100 g of aryl amine | 50 g of Nonyl amine | Oleic acid Nonyl amine |

TABLE 1-continued

| | Ag nanoparticle | First amine | Second amine | Final Dispersant (2 kinds) |
|---|---|---|---|---|
| Example 8 | 50 g of Ag nanoparticles capped with oleic acid | 100 g of aryl amine | Bis-2-ethyl hexyl amine | Oleic acid Decyl amine |
| Example 9 | 50 g of Ag nanoparticles capped with palmitic acid | 50 g of aryl amine | 2-stearyl amine | Palmitic acid 2-stearyl amine |

Comparison Example 1

Silver nanoparticles were produced by mixing 6.5 g of Ag acetate, 13 g of oleyl amine, and 13 g of oleic acid and reacting the mixture at 110° C. for 2 hours. 1 g Of silver nanoparticles of 5 nm size were obtained with respect to 6.5 g of the Ag precursor. When oleyl amine and oleic acid were mixed simultaneously, particles that were produced only by oleic acid could be obtained, but the yield was quite low.

Figure 3:
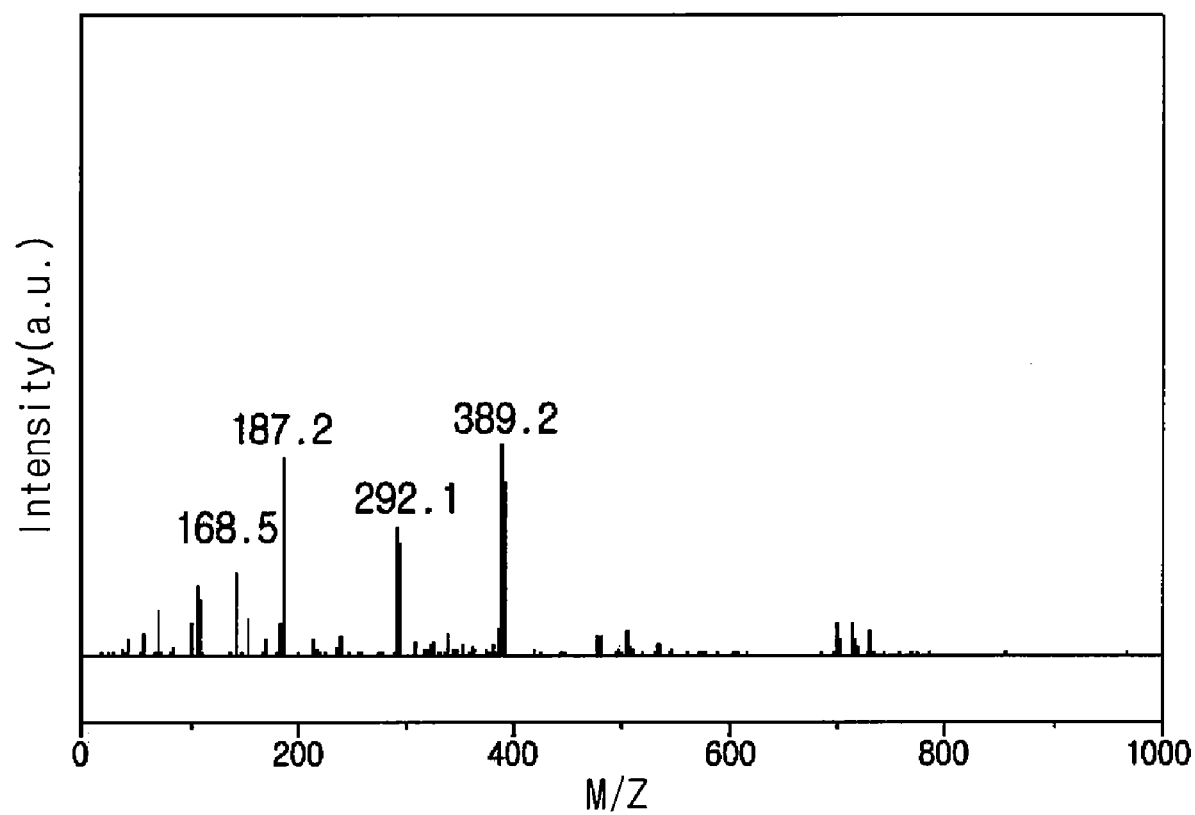
FIG. 3 is a Maldi-TOF MS spectrum of the silver nanoparticles produced according to Example 1 of the invention.

FIG. 3 represents a Maldi-TOF MS spectrum of the silver nanoparticles produced according to Example 1 of the invention. In FIG. 3, each parameter represents the follows.
1. 168.5=>[THAP+H$^+$]
2. 187.2=>[Dodecyl amine+H$^+$]
3. 292.1=>[Dodecyl amine+Ag$_{107}^+$]
4. 389.2=>[Oleic acid+Ag$_{107}^+$]

As shown in FIG. 3, it is noted that a fatty acid and an amine are capped as dispersant at the same time on the surface of metal nanoparticles produced according to the invention, that may decrease a curing temperature of ink when they are used in the production of ink.

Figure 4:
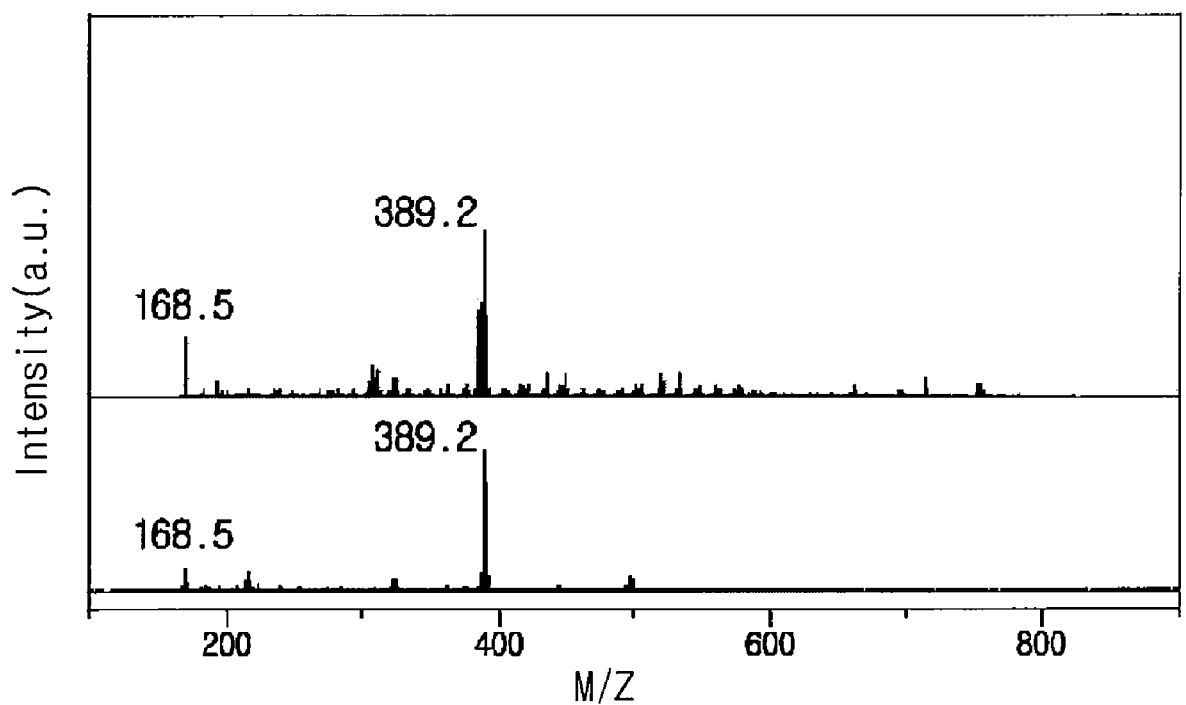
FIG. 4 is a Maldi-TOF MS spectrum of the silver nanoparticles produced according to Comparison Example 1 of the invention.

On the other hand, FIG. 4 represents a Maldi-TOF MS spectrum of the silver nanoparticles produced according to Comparison Example 1 of the invention. It is noted that the silver nanoparticles are capped only with oleic acid. In FIG. 4, each parameter represents the follows.
1. 168.5=>[THAP+H$^+$]
2. 389.2=>[Oleic acid+Ag$_{107}^+$]

The invention is not limited to the examples stated above and it is also apparent that more changes may be made by those skilled in the art without departing from the principles and spirit of the present invention.

As described earlier, the method for producing metal nanoparticles according to the invention is substituting a part of fatty acid capped on the surface of metal nanoparticles by a short chain amine and then by a long chain amine, which allows simple and mass production of metal nanoparticles capped with 2 kinds of dispersants and can be applied to ink for inkjet and lower the curing temperature of the ink.

What is claimed is:

1. A method for producing metal nanoparticles with dispersants on their surfaces used for inkjet, the method comprising,
preparing metal nanoparticles capped with a fatty acid;
heating a first mixture of the capped metal nanoparticles and a linear or branched first amine of $C_1$-$C_7$ in an organic solvent so that a part of the fatty acid is substituted by the first amine and the first amine is bonded to the metal nanoparticles; and
heating a second mixture obtained by adding a linear or branched second amine of $C_8$-$C_{20}$ to the first mixture so that the first amine is re-substituted by the second amine.

2. The method of claim 1, wherein the metal nanoparticles comprise one or more metals selected from the group consisting of silver, gold, copper, nickel, cobalt, platinum, palladium and their alloys.

3. The method of claim 1, wherein the fatty acid is a saturated or unsaturated fatty acid of $C_3$-$C_{22}$.

4. The fatty acid of claim 3, wherein the fatty acid is one or more compounds selected from the group consisting of hexanoic acid, heptanoic acid, nonanoic acid, decanoic acid, undecanoic acid, dodecanoic acid, oleic acid, myristic acid, palmitic acid, stearic acid, linolic acid, linoleic acid and linolenic acid.

5. The method of claim 1, wherein the organic solvent is one or more of non-aqueous solvents selected from the group consisting of hexane, toluene, xylene, chloroform, dichloromethane, tetradecane, octadecene, chlorobenzoic acid, 1-hexadecene, 1-tetradecene and 1-octadecene.

6. The method of claim 1, wherein the first amine is one or more compounds selected from the group consisting of methyl amine, ethyl amine, propyl amine, butyl amine, hexyl amine, heptyl amine, aryl amine and N,N-diisopropylamine.

7. The method of claim 1, wherein the second amine is one or more compounds selected from the group consisting of octyl amine, nonyl amine, decyl amine, dodecyl amine, oleyl amine, 2-ethylhexyl amine and hexadecyl amine.

8. The method of claim 1, wherein the first amine is added 50-200 parts by weight, and the organic solvent is added by 100-300 parts by weight with respect to 100 parts by weight of metal nanoparticles.

9. The method of claim 1, wherein the heating of the first mixture is performed in a range of 60-90° C.

10. The method of claim 1, wherein the second amine is added by 50-200 parts by weight with respect to 100 parts by weight of metal nanoparticles.

11. The method of claim 1, wherein the heating of the second mixture is performed in a range of 100-120° C.

* * * * *